United States Patent
Aihara (10) Patent No.: US 9,912,832 B2
(45) Date of Patent: Mar. 6, 2018

(54) IMAGE FORMING APPARATUS AND CONTROL METHOD OF THE SAME

(71) Applicants: KABUSHIKI KAISHA TOSHIBA, Tokyo (JP); TOSHIBA TEC KABUSHIKI KAISHA, Tokyo (JP)

(72) Inventor: Yutaka Aihara, Izu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/459,370

(22) Filed: Aug. 14, 2014

(65) Prior Publication Data

US 2016/0050337 A1 Feb. 18, 2016

(51) Int. Cl.
| | |
|---|---|
| H04N 1/32 | (2006.01) |
| H04N 1/21 | (2006.01) |
| H04N 1/00 | (2006.01) |

(52) U.S. Cl.
CPC ..... *H04N 1/32496* (2013.01); *H04N 1/00408* (2013.01); *H04N 1/2104* (2013.01); *H04N 1/32486* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,396,235 | A * | 3/1995 | Maeshima et al. | 341/34 |
| 5,740,497 | A * | 4/1998 | Yamada | G03G 15/5012 358/437 |
| 5,801,837 | A * | 9/1998 | Hamanaka | H04N 1/3248 358/296 |
| 5,847,857 | A * | 12/1998 | Yajima | G06F 3/1215 358/296 |
| 6,064,489 | A * | 5/2000 | Nosaki | H04N 1/32512 358/1.13 |
| 6,169,863 | B1 * | 1/2001 | Osari et al. | 399/82 |
| 6,476,933 | B1 * | 11/2002 | Honma | H04N 1/00238 358/1.9 |
| 6,577,907 | B1 * | 6/2003 | Czyszczewski | H04N 1/00411 358/442 |
| 6,999,198 | B1 * | 2/2006 | Nakagiri | B42C 19/00 358/1.13 |
| 7,533,180 | B2 * | 5/2009 | Ebihara | G06F 21/10 709/223 |
| 9,641,718 | B2 * | 5/2017 | Goto | H04N 1/2104 |
| 2003/0184780 | A1 * | 10/2003 | Matsuda | G06K 15/00 358/1.11 |
| 2004/0136549 | A1 * | 7/2004 | Pennock et al. | 381/119 |

(Continued)

*Primary Examiner* — Madelein Nguyen
(74) *Attorney, Agent, or Firm* — Patterson & Sheridan, LLP (57) ABSTRACT

An image forming apparatus includes a setting unit, an image reading unit, an image forming unit, and a setting changing unit. The setting unit sets copying conditions. The image reading unit reads images from sheets to generate image data and writes the image data into a memory unit. The image forming unit forms images on sheets based on the image data written into the memory unit. The setting changing unit changes the setting of the copying conditions when a new copying condition is set during the image forming of the image data written into the memory unit.

19 Claims, 8 Drawing Sheets

(56) References Cited

U.S. PATENT DOCUMENTS

| | | | |
|---|---|---|---|
| 2005/0105128 A1* | 5/2005 | Konno | H04N 1/00347 358/1.15 |
| 2005/0105135 A1* | 5/2005 | Takahashi | G06F 3/0486 358/1.18 |
| 2005/0275867 A1* | 12/2005 | Higashiura et al. | 358/1.14 |
| 2006/0023262 A1* | 2/2006 | Denpo | H04N 1/00408 358/400 |
| 2006/0139680 A1* | 6/2006 | Okamoto | H04N 1/32486 358/1.14 |
| 2006/0143286 A1* | 6/2006 | Aoki | H04N 1/00209 709/220 |
| 2006/0227375 A1* | 10/2006 | Kamimura | H04N 1/32486 358/1.16 |
| 2006/0238786 A1* | 10/2006 | Sakura et al. | 358/1.9 |
| 2007/0118383 A1* | 5/2007 | Fukada et al. | 704/275 |
| 2008/0037042 A1* | 2/2008 | Furuichi et al. | 358/1.6 |
| 2008/0239381 A1* | 10/2008 | Oshima | 358/1.15 |
| 2008/0297839 A1* | 12/2008 | Kayama et al. | 358/1.15 |
| 2009/0016185 A1* | 1/2009 | Kakimoto | 369/53.22 |
| 2010/0161363 A1* | 6/2010 | Nakane | G06Q 30/018 358/1.15 |
| 2010/0171986 A1* | 7/2010 | Amorosa | G06F 21/6209 358/1.16 |
| 2010/0214602 A1* | 8/2010 | Moriwaki | G03G 15/553 358/1.15 |
| 2010/0231931 A1* | 9/2010 | Tao | H04N 1/32358 358/1.6 |
| 2010/0276870 A1* | 11/2010 | Yamada | B41J 3/60 271/225 |
| 2010/0290793 A1* | 11/2010 | Kaneko | 399/24 |
| 2010/0302593 A1* | 12/2010 | Kawasaki | G06F 3/1203 358/1.16 |
| 2011/0032567 A1* | 2/2011 | Ishida | G06F 21/56 358/1.15 |
| 2011/0090533 A1* | 4/2011 | Shimizu | G06F 3/1222 358/1.15 |
| 2011/0179961 A1* | 7/2011 | Yanagawa | 101/483 |
| 2011/0199623 A1* | 8/2011 | Okuyama | 358/1.9 |
| 2011/0264876 A1* | 10/2011 | Kaiya | G06F 3/0617 711/162 |
| 2011/0273738 A1* | 11/2011 | Tanaka et al. | 358/1.14 |
| 2012/0013942 A1* | 1/2012 | Kuwahara | G06F 3/1204 358/1.15 |
| 2012/0053885 A1* | 3/2012 | Kato | G06F 3/1221 702/128 |
| 2012/0063833 A1* | 3/2012 | Yanagida | B41J 13/106 400/582 |
| 2012/0099138 A1* | 4/2012 | Hirata | 358/1.14 |
| 2012/0162678 A1* | 6/2012 | Kato | G03G 15/502 358/1.12 |
| 2012/0194596 A1* | 8/2012 | Yamada | B41J 3/60 347/16 |
| 2012/0229853 A1* | 9/2012 | Okada | G06F 3/121 358/1.15 |
| 2012/0229860 A1* | 9/2012 | Morita | G06F 3/1208 358/1.18 |
| 2013/0070302 A1* | 3/2013 | Tsuchitoi | G06K 15/1809 358/1.18 |
| 2013/0094058 A1* | 4/2013 | Kaminaka | H04N 1/00424 358/1.15 |
| 2013/0188216 A1* | 7/2013 | Katahira | 358/1.14 |
| 2014/0104647 A1* | 4/2014 | Hamada | H04N 1/00912 358/1.15 |
| 2014/0211256 A1* | 7/2014 | Hosotsubo | 358/1.15 |
| 2015/0002571 A1* | 1/2015 | Kono | B41J 2/01 347/16 |
| 2015/0131119 A1* | 5/2015 | Narahashi et al. | 358/1.15 |
| 2016/0165089 A1* | 6/2016 | Goto | H04N 1/2104 358/1.16 |

\* cited by examiner

IMAGE FORMING APPARATUS AND CONTROL METHOD OF THE SAME

FIELD

Embodiments described herein relate generally to an image forming apparatus and a control method of the same.

BACKGROUND

A recent image forming apparatus reads a sheet by an image reading sensor included therein and performs copying of the image onto a print media. The image forming apparatus may be instructed to change the number of output copies to be copied when performing copying.

However, it is necessary for a user to manually set the number of output copies, and set any data storage settings, before performing copying. Accordingly, in some cases, a user has to execute re-reading of the document image if the user forgot to set a number of output copies or data storage to settings different than the default settings of the image forming apparatus.

DETAILED DESCRIPTION

In general, according to one embodiment, an image forming apparatus includes a setting unit, an image reading unit, an image forming unit, and a setting changing unit. The setting unit sets copying conditions. The image reading unit reads images from sheets to generate image data and writes the image data into a memory unit. The image forming unit forms images on sheets based on the image data written into the memory unit. The setting changing unit changes the setting of the copying conditions when a new copying condition is set during the image forming of the image data written into the memory unit.

Figure 1:
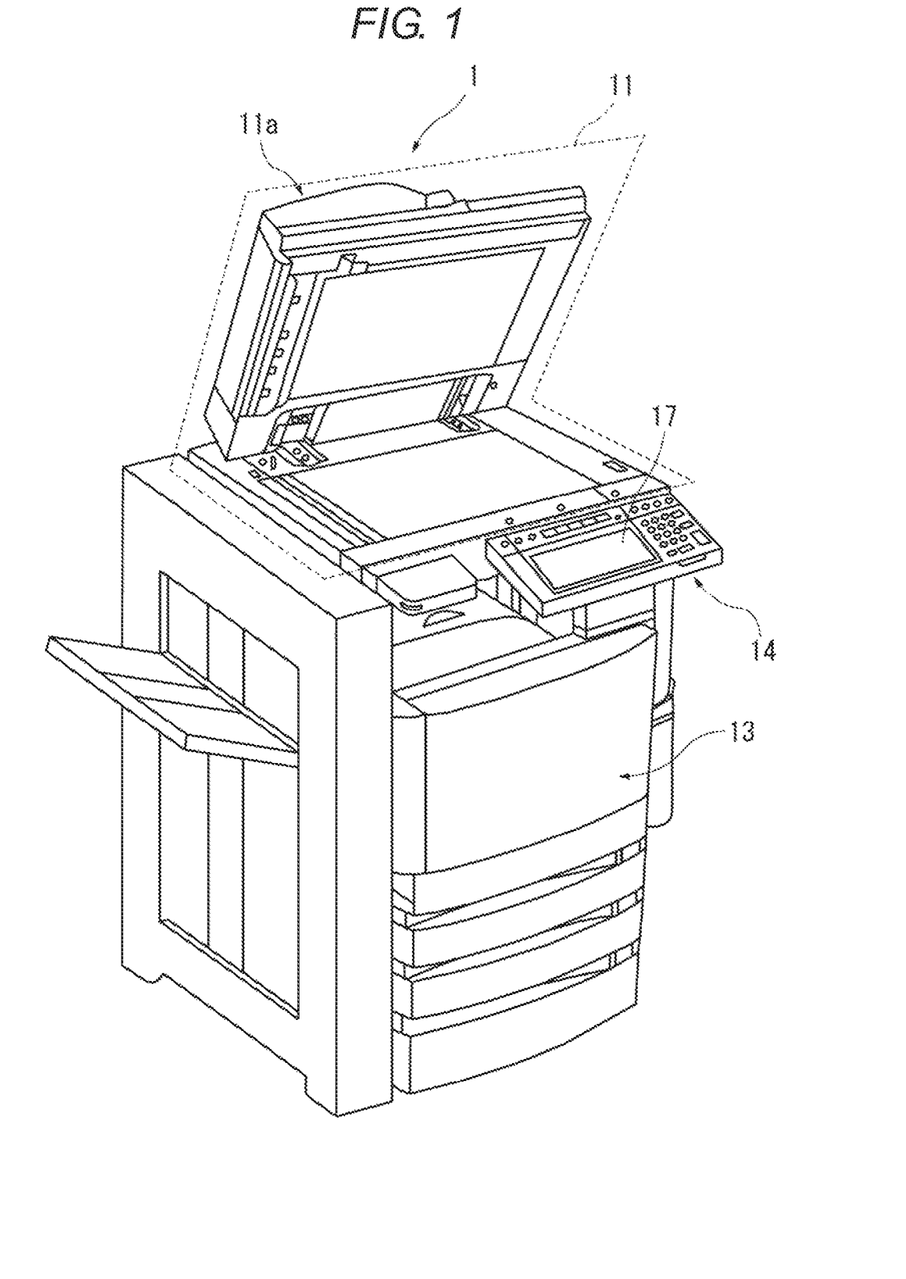
FIG. 1 is an external view illustrating one example of an image forming apparatus according to an exemplary embodiment.

Hereinafter, the image forming apparatus of the exemplary embodiment will be described with reference to the drawings. The same constituent elements in each drawing are denoted with the same reference numerals. FIG. 1 is an external view illustrating one example of an image forming apparatus 1 of the exemplary embodiment. The image forming apparatus 1 is, for example, a multifunction printer (MFP). The image forming apparatus 1 reads a plurality of sheets. The image forming apparatus 1 generates digital image data based on the reading of the sheets. A sheet is, for example, paper or a film with an article, a letter, a drawing, and the like thereon. The sheet may be anything as long as it may be read by the image forming apparatus 1. In the example shown in the drawing, the image forming apparatus 1 includes an image reading unit 11, an image forming unit 13, an operation unit 14, and a display 17.

The image forming apparatus 1 is not limited to an image forming apparatus for fixing a toner image, and may be an inkjet type image forming apparatus.

Figure 2:
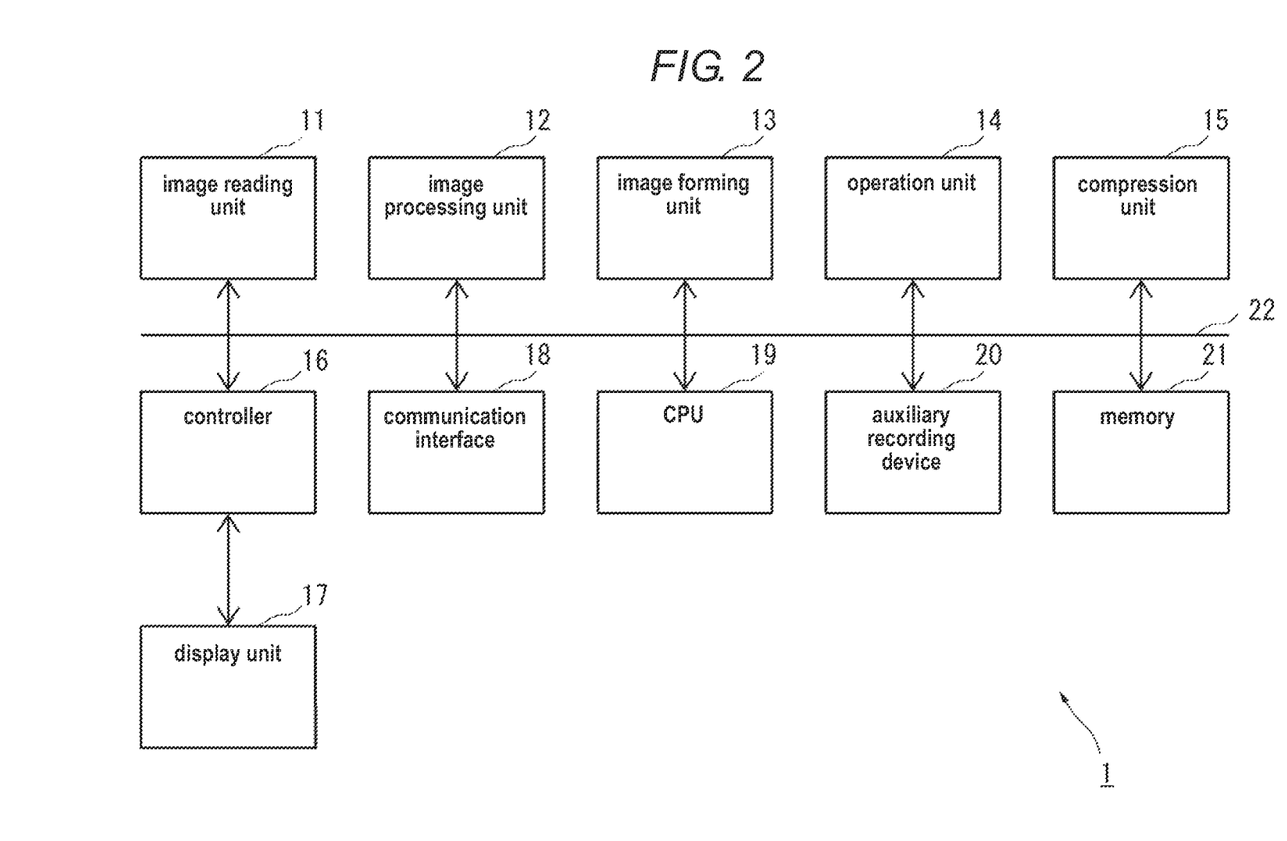
FIG. 2 is a block diagram illustrating a configuration example of the image forming apparatus according to the exemplary embodiment.

FIG. 2 is a block diagram illustrating a configuration example of the image forming apparatus 1 of the exemplary embodiment. In the example illustrated in the drawing, the image forming apparatus 1 includes the image reading unit 11, the image processing unit 12, the image forming unit 13, the operation unit 14, a compression unit 15, a liquid crystal display (LCD) controller 16, the display (display unit) 17, a communication interface 18, a central processing unit (CPU) 19, an auxiliary recording device 20, and a memory 21. Each unit included in the image forming apparatus 1 is interconnected with each other via an internal bus 22. Each unit included in the image forming apparatus 1 inputs and outputs data to and from each other through the internal bus 22.

The image reading unit 11 includes an automatic sheet feeding device 11a. The image reading unit 11 continuously reads image data of a plurality of sheets using the automatic sheet feeding device 11a. For example, the image reading unit 11 includes a sensor such as a contact image sensor (CIS) or a charge coupled device (CCD). The image reading unit 11 reads the sheets using the sensor. Then, the image reading unit 11 generates image data.

The image processing unit 12 performs image processing with respect to the image data generated by the image reading unit 11, based on preset reading conditions. For example, when a gamma compensation process and a filtering process are included in the reading conditions, the image processing unit 12 executes the gamma compensation process and the filtering process with respect to the image data. In addition, when the gamma compensation process and the filtering process are not included in the reading conditions, the image processing unit 12 may perform image processing which is designated in advance. The reading conditions with respect to the image processing unit 12 are not limited to the gamma compensation process or the filtering process, and may be any conditions as long as the reading conditions are conditions relating to the operation of the image processing unit 12. For example, the reading conditions with respect to the image processing unit 12 include a resolution. The reading conditions with respect to the image processing unit 12 may be conditions for reading an image as a color image or a monochrome image.

The image forming unit 13 prints the image data read by the image reading unit 11 on a predetermined sheet.

The operation unit 14 includes a numeric keypad, a plurality of buttons, and a touch panel. The touch panel is integrally formed with the display 17.

The compression unit 15 compresses data based on the reading conditions to generate compressed data. For example, the compression unit 15 compresses the image data subjected to the image processing by the image processing unit 12 based on the reading conditions. For example, when a compression ratio is included in the reading conditions, the compression unit 15 compresses the data with the compression ratio in the reading conditions. When the compression ratio is not included in the reading conditions, the compression unit 15 may compress the data with a compression ratio which is designated in advance. In addition, the reading conditions with respect to the compression unit 15 is not limited to the compression ratio and may be any conditions as long as the reading conditions are conditions relating to the operation of the compression unit 15.

The LCD controller 16 controls an operation of the display 17. The display 17 is, for example, a liquid crystal display including a touch panel. The display 17 operates as an output interface. The display 17 displays letters or images. In addition, the display 17 operates as the operation unit 14 when the display includes the touch panel or the like. The display 17 receives input from a user when the display operates as the operation unit 14.

The communication interface 18 performs transmission and reception of data to and from another device. The communication interface 18 operates as an input interface. The communication interface 18 receives data transmitted from the other device. In addition, the communication interface 18 operates as an output interface. The communication interface 18 transmits data with respect to the other device.

The CPU 19 executes a program stored in the auxiliary recording device 20. For example, the CPU 19 operates as a control unit. The CPU 19 controls the operation of each unit of the image forming apparatus 1.

The auxiliary recording device 20 is, for example, a nonvolatile recording device. The auxiliary recording device 20 is a hard disk or a solid state drive (SSD). The auxiliary recording device 20 stores image data read by the image reading unit 11 and data used in each unit of the image forming apparatus 1. The memory 21 is, for example, a random access memory (RAM). The memory 21 temporarily records data used in each unit of the image forming apparatus 1. The memory 21 temporarily records the image data read by the image reading unit 11.

The image forming apparatus 1 of the exemplary embodiment operates based on the copying conditions and the reading conditions. The copying conditions include information for setting the number of copies of the sheets being copied, brightness, contrast, and a sheet tray from which the sheets to be printed upon will be sourced. The copying conditions further include information for setting a reduction ratio or an enlargement ratio. The copying conditions further include information for setting the print to monochrome or color. The copying conditions further include information indicating whether or not to write the image data, read from the sheet when performing copying, in the auxiliary recording device 20 to store it therein. The number of copies of the sheets to be copied is also referred to as the number of output copies.

The copying conditions are not limited to the conditions described above. The copying conditions may include detailed conditions when storing image data, such as a storage destination of image data in the auxiliary recording device 20. The copying conditions may also include detailed conditions when storing image data, such as a format of a file of image data in the auxiliary recording device 20. The copying conditions are input by a user with respect to the image forming apparatus 1 as will be described later.

The reading conditions, for example, include one or more conditions such as a reading resolution, an image compression ratio, the gamma compensation process, the filter process, or color information. The reading conditions are not limited to the conditions described above. The reading conditions may include any conditions as long as the reading conditions are conditions relating to the operation of the image forming apparatus 1. The reading conditions may be predetermined or may be set by a user. The reading conditions, for example, may be recorded in the auxiliary recording device 20, in advance. In addition, for example, the operation unit 14 may receive the input of the reading conditions. Further, for example, the communication interface 18 may receive the reading conditions transmitted from the other device.

Conditions relating to storage of the image data to the auxiliary recording device 20 are called data storage setting conditions. The data storage setting conditions include detailed conditions when storing image data. A specific example of the detailed conditions is information indicating a format of a file of image data. In addition, the data storage setting conditions include the conditions such as the reading resolution, the image compression ratio, and the color information.

Figure 3:
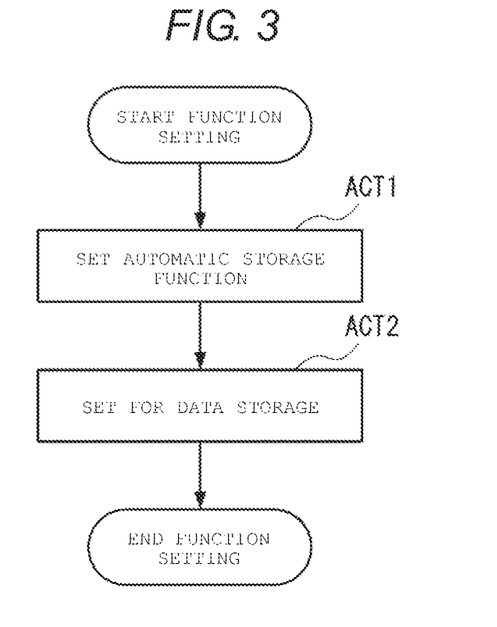
FIG. 3 is a flowchart illustrating a flow of a function setting operation of the image forming apparatus according to the exemplary embodiment.

Next, an operation example of the image forming apparatus 1 of the exemplary embodiment will be described with reference to FIG. 3. FIG. 3 is a flowchart illustrating a flow of a function setting process performed by the image forming apparatus 1. The image forming apparatus 1 controls each unit by executing a predetermined program by the CPU 19, and performs the function setting process. The image forming apparatus 1 starts the function setting process when a user presses a predetermined button provided in the operation unit 14. The image forming apparatus 1, first, performs a setting process of an automatic storage function (ACT1).

In the exemplary embodiment, the automatic storage function of the image forming apparatus 1 is a function of the image forming apparatus 1 to automatically store data in order to use the data later. In the exemplary embodiment, the automatic storage function includes an operation of inquiring a user as to whether or not image data is to be stored in the auxiliary recording device 20 in accordance with the predetermined data storage setting conditions as described below, and the storing of the image data in the auxiliary recording device 20 is performed by user instruction. The image data to be stored in the auxiliary recording device 20 is data read by the image reading unit 11. The image forming apparatus 1 sets the automatic storage function to be effective or ineffective, according to an operation of a user with respect to the operation unit 14 (ACT1).

Next, the image forming apparatus 1 performs a setting process for data storage (ACT2). As the setting process for data storage, the image forming apparatus 1 sets the data storage setting conditions, that is, a threshold value of a number of copies (e.g., 10 sets) and a threshold value of a number of sheets (e.g., 20 sheets), based on an operation of a user with respect to the operation unit 14.

Figure 4A:
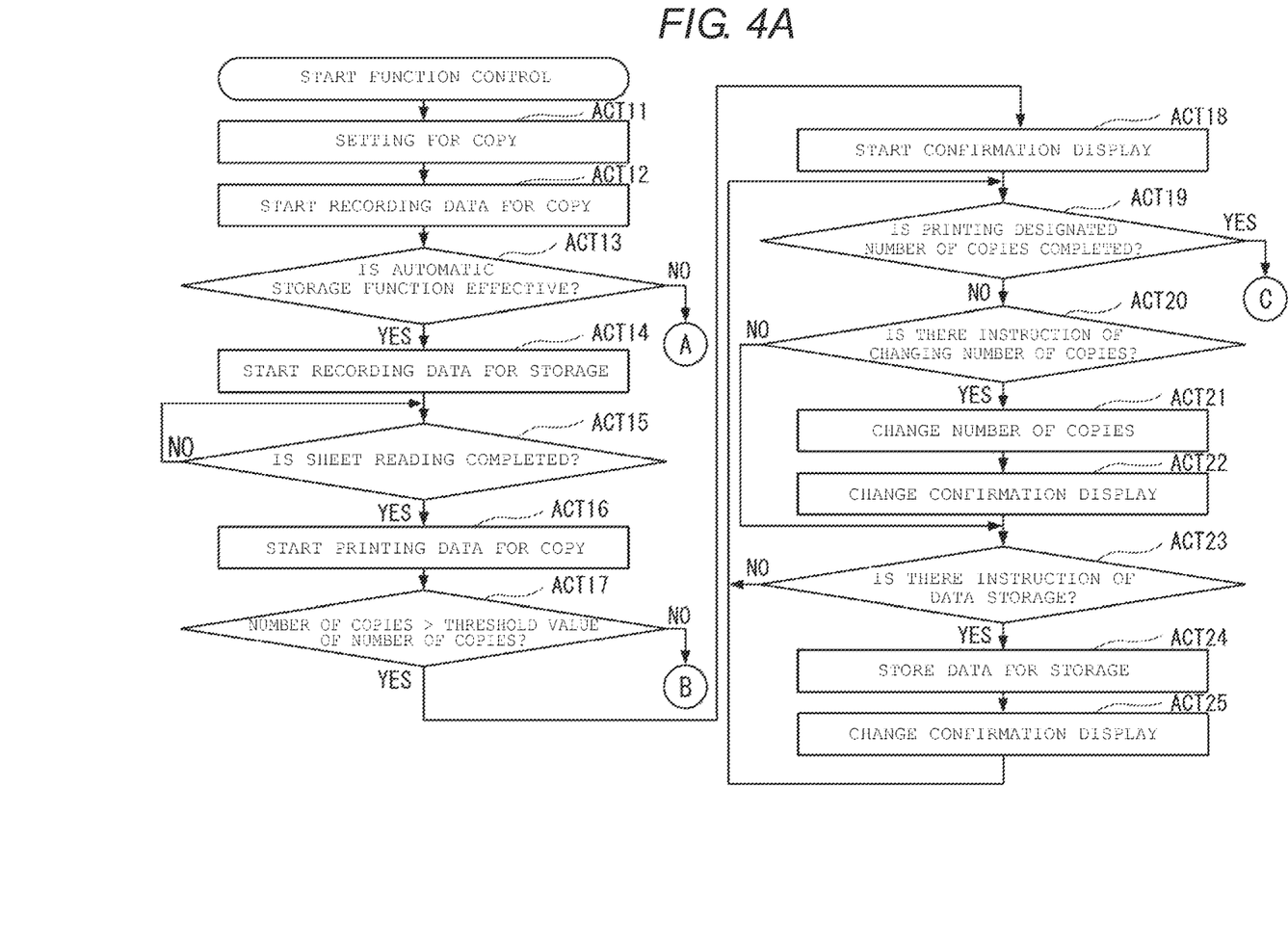
FIG. 4A is a flowchart illustrating a flow of a function control operation of the image forming apparatus according to the exemplary embodiment with FIG. 4B.
Figure 4B:
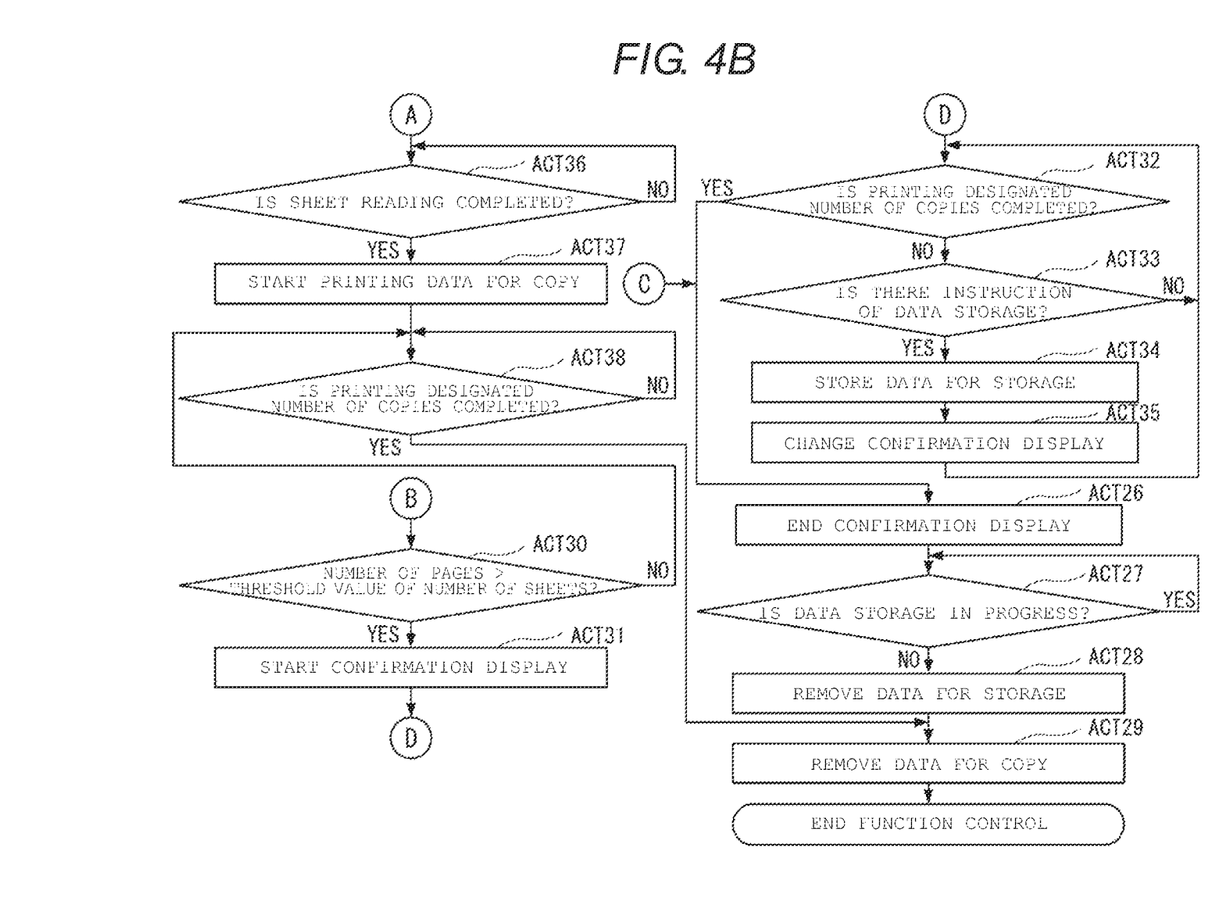
FIG. 4B is a flowchart illustrating a flow of a function control operation of the image forming apparatus according to the exemplary embodiment with FIG. 4A.

Next, the other operation examples of the image forming apparatus 1 of the exemplary embodiment will be described with reference to FIG. 4A to FIG. 10. FIGS. 4A and 4B illustrate a flowchart illustrating an example of a flow of a function control process performed by the image forming apparatus 1. FIGS. 4A and 4B illustrate one flowchart. FIGS. 4A and 4B are connected to each other at parts of connectors A, B, and C. In the function control process illustrated in FIGS. 4A and 4B, the image forming apparatus 1 performs a copying function. In addition, when performing the copying function, the image forming apparatus 1 uses information set in the function setting process illustrated in FIG. 3. After a user loads a sheet on the automatic sheet feeding device 11a and presses a predetermined button of the operation unit 14, the image forming apparatus 1 starts the function control process.

The image forming apparatus 1, first, sets various conditions for copying (hereinafter, referred to as copying conditions) (ACT11). The copying conditions are a part or all of the copying conditions described above. In ACT11, the image forming apparatus 1 displays a predetermined setting screen on the display 17. In addition, in ACT11, the image forming apparatus 1 receives an operation of a user with respect to the operation unit 14. Then, the image forming apparatus 1 stores various conditions in the memory 21 or the like, based on the operation of the user with respect to the operation unit 14. The information regarding the number of output copies is included in the copying conditions.

Next, the image forming apparatus 1 stores the copying conditions as copying data (ACT12).

Next, the image forming apparatus 1 determines whether or not the automatic storage function is set to be effective (ACT13). That is, the image forming apparatus 1 refers to the setting of an effective or ineffective state, i.e., store or not to store, of the automatic storage function in ACT1 in FIG. 3. When the automatic storage function is effective (ACT13: YES), the image forming apparatus 1 starts a reading process by the image reading unit 11 and a recording process of storage data (ACT14). The image forming apparatus 1 writes the storage data into the memory 21 based on the copying conditions set in ACT11. Hereinafter, when the image reading unit 11 outputs the image data, the image processing unit 12 and the compression unit 15 perform a process based on the data storage setting conditions. Then, the image data processed by the image processing unit 12 and the compression unit 15 is written into a predetermined area of the memory 21.

Next, the image forming apparatus 1 determines whether a reading operation of the image reading unit 11 is completed (ACT15). The image reading unit 11 continues to read images until all sheets loaded on the automatic sheet feeding device 11a are scanned (ACT15: NO).

When the reading of the sheets are completed (ACT15: YES), the image forming apparatus 1 controls the image forming unit 13 or the like. Then, the image forming apparatus 1 performs image forming of the image data (that is, copying data) stored in the memory 21 based on the copying conditions (ACT16).

Figure 5:
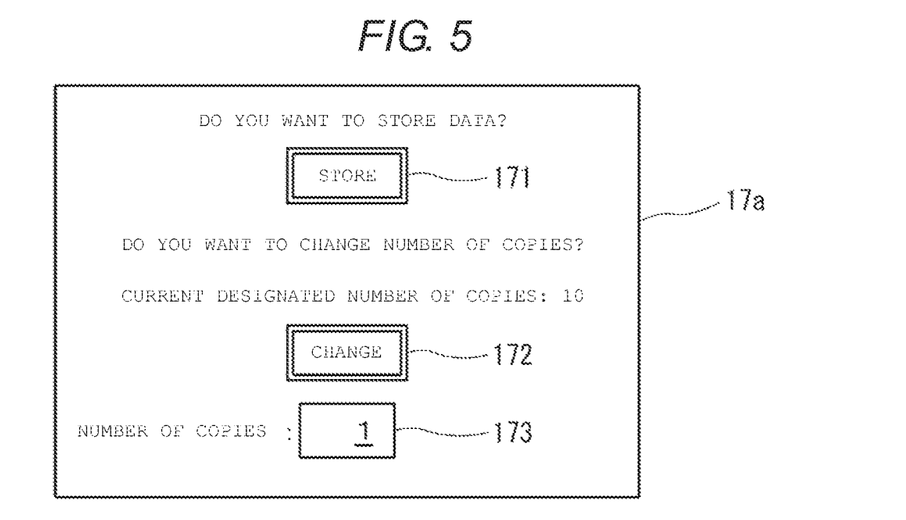
FIG. 5 is a schematic view illustrating a display example of a display of the image forming apparatus according to the exemplary embodiment.

Next, the image forming apparatus 1 compares the number of output copies included in the copying conditions and a predetermined threshold value of the number of copies to each other (ACT17). The threshold value of the number of copies is a whole number equal to or larger than 1. The threshold value of the number of copies may be preset in ACT2 of FIG. 3 or may be changed by a user as needed. When the number of output copies exceeds the threshold value of the number of copies (ACT17: YES), the image forming apparatus 1 displays a predetermined confirmation screen on the display 17 (ACT18). The confirmation screen includes information for requesting a user whether or not to store the image data recorded in memory 21 into the auxiliary recording device 20 or whether or not to change the number of output copies. FIG. 5 illustrates an example of the confirmation screen. A confirmation screen 17a includes a button 171, a button 172, and a box 173. The button 171 is pressed when a user instructs the image forming apparatus to store the image data in the auxiliary recording device 20. The button 172 is pressed when a user instructs a change of the number of output copies. The box 173 is used for displaying the changed number of output copies. The number in the box 173 is changed, by operation of the numeric keypads of the operation unit 14 by a user.

Figure 6:
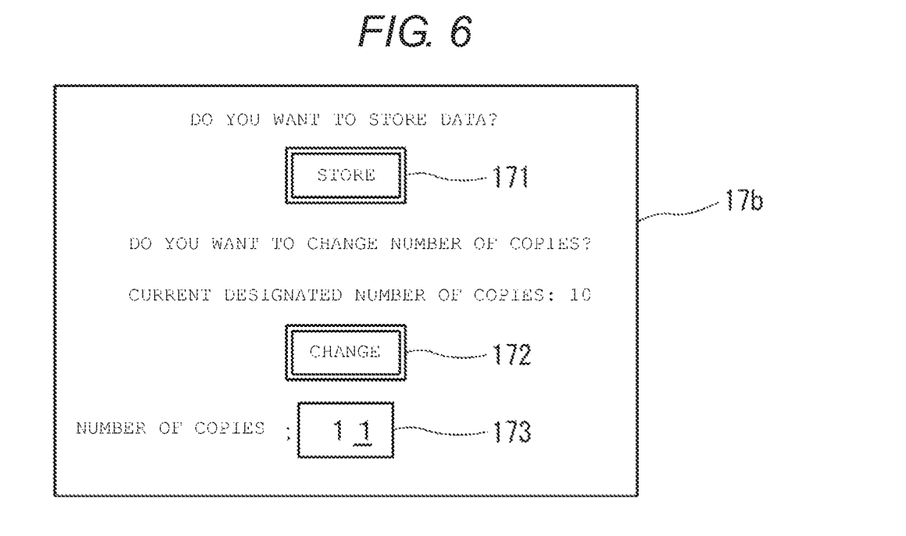
FIG. 6 is a schematic view illustrating a display example of the display of the image forming apparatus according to the exemplary embodiment.
Figure 7:
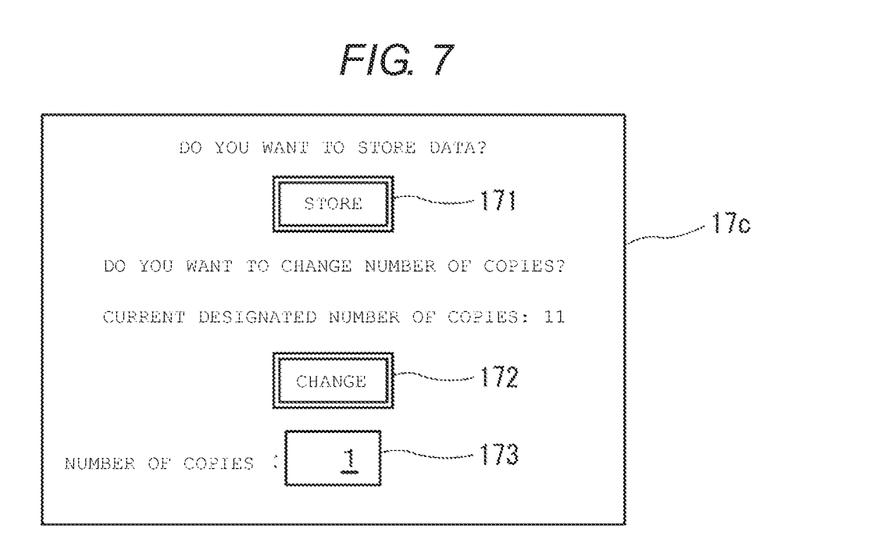
FIG. 7 is a schematic view illustrating a display example of the display of the image forming apparatus according to the exemplary embodiment.

Next, the image forming apparatus 1 determines whether or not the image forming for the number of designated copies by the image forming unit 13 is completed (ACT19). The number of designated copies is the number of copies designated in ACT11 or the number of designated copies changed in ACT21 which will be described later. The image forming apparatus 1 continues the process to ACT20, when the image forming for the number of designated copies is not completed (ACT19: NO). Then, the image forming apparatus 1 determines whether or not a user performed an operation of instructing the change of the number of copies, based on the display of the confirmation screen (ACT20). The image forming apparatus 1 continues the process to ACT21, when there is an instruction of the change of the number of copies (ACT20: YES). Then, the image forming apparatus 1 changes the setting of the number of output copies included in the copying conditions, based on the number of copies set by a user (ACT21). Next, the image forming apparatus 1 changes the content of the confirmation screen to be displayed by the display 17 in ACT18 (ACT22). FIG. 6 illustrates a confirmation screen 17b in a state where a user inputs an instruction of a change of the number of output copies from 1 to 11. In FIG. 7, a user inputs the instruction of the change of the number of output copies from 11 to 1. In addition, after a user presses the button 172, the display 17 shows a confirmation screen 17c in a state where the content in ACT22 is changed.

Figure 8:
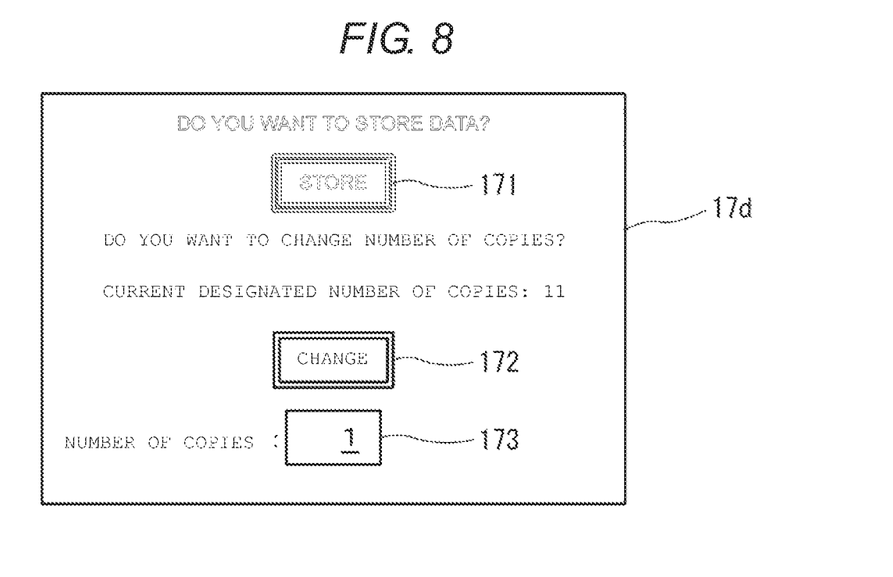
FIG. 8 is a schematic view illustrating a display example of the display of the image forming apparatus according to the exemplary embodiment.

Meanwhile, the image forming apparatus 1 continues the process to ACT23, when there is no instruction to change of the number of copies (ACT20: NO). Then, the image forming apparatus 1 determines whether or not a user performed the operation of instructing the storage of the image data from memory 21 into auxiliary recording device 20, based on the display of the confirmation screen (ACT23). When there is the instruction to store the image data (ACT23: YES), the image forming apparatus 1 sets an instruction to perform the data storage in the auxiliary recording device 20 (ACT24). Next, the image forming apparatus 1 changes the content of the confirmation screen started to be displayed by the display 17 in ACT18 (ACT25). FIG. 8 illustrates an example of a confirmation screen 17d after changing the content. The confirmation screen 17d in FIG. 8 includes display content in a state where the button 171 is ineffective after a user pressed the storage button 171.

The image forming apparatus 1 continues the process to ACT19 after the display of the confirmation screen is changed (ACT25) or when there is no instruction to store the image data (ACT23: NO). Then, the image forming apparatus 1 determines again whether or not the image forming for the number of designated copies by the image forming unit 13 is completed (ACT19). The image forming apparatus 1 continues the process to ACT26, when it is determined that the image forming for the number of designated copies by the image forming unit 13 is completed (ACT19: YES). Then, the image forming apparatus 1 removes the predetermined confirmation screen displayed on the display 17 (ACT26).

Next, the image forming apparatus 1 determines whether or not a storage process of the image data in the auxiliary recording device 20 is in progress (ACT27). The image forming apparatus 1 repeats the process, when the storage process of the image data in the auxiliary recording device 20 is in progress (ACT27: YES). That is, the image forming apparatus 1 stands by until the storage process ends. When the storage process is completed (ACT27: NO), the image forming apparatus 1 removes the storage data recorded in the memory 21 (ACT28). Next, the image forming apparatus 1 removes the copying data recorded in the memory 21 (ACT29). Here, the function control process ends.

Figure 9:
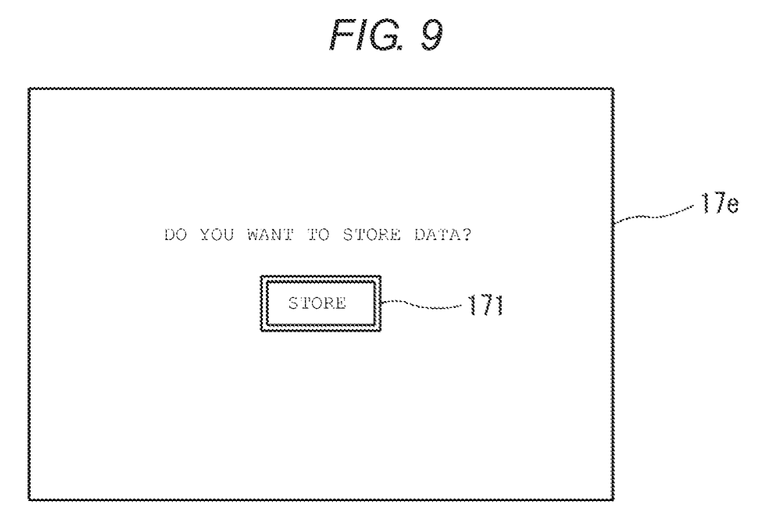
FIG. 9 is a schematic view illustrating a display example of the display of the image forming apparatus according to the exemplary embodiment.

Meanwhile, the image forming apparatus 1 continues the process to ACT30, when it is determined that the number of output copies does not exceed the threshold value of the number of copies by the image forming apparatus 1 in ACT17 (ACT17: NO). Then, the image forming apparatus 1 compares the number of pages of the sheets read by the image reading unit 11 and a predetermined threshold value of the number of sheets to each other (ACT30). The threshold value of the number of sheets is a whole number equal to or larger than 1. The threshold value of the number of sheets may be preset in ACT2 of FIG. 3 or may be changed by a user as needed. When the number of read pages exceeds the threshold value of the number of sheets (ACT30: YES), the image forming apparatus 1 displays a predetermined confirmation screen on the display 17 (ACT31). The confirmation screen includes information for requesting from a user whether or not to store the image data in the auxiliary recording device 20. FIG. 9 illustrates an example of the confirmation screen. A confirmation screen 17e includes the button 171. The button 171 is pressed when a user instructs the image forming device 1 to store the image data.

Figure 10:
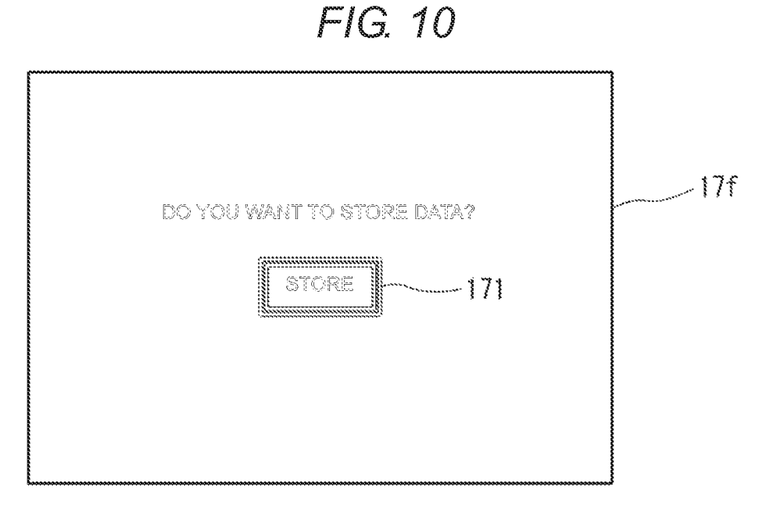
FIG. 10 is a schematic view illustrating a display example of the display of the image forming apparatus according to the exemplary embodiment.

Next, the image forming apparatus 1 determines whether or not image forming for the number of designated copies by the image forming unit 13 is completed (ACT32). The number of designated copies is the number of copies designated in ACT11. The image forming apparatus 1 continues the process to ACT33, when image forming for the number of designated copies is not completed (ACT32: NO). Then, the image forming apparatus 1 determines whether or not a user performed an operation of instructing storage of the image data, based on the display of the confirmation screen (ACT33). The image forming apparatus 1 continues the process to ACT34, when there is the instruction of the storage (ACT33: YES). The image forming apparatus 1 performs a process based on the data storage setting conditions set in ACT2 in FIG. 3. That is, the image forming apparatus 1 stores the storage data recorded in the memory 21 in the auxiliary recording device 20 (ACT34). Next, the image forming apparatus 1 changes the content of the confirmation screen starting to be displayed by the display 17 in ACT31 (ACT35). FIG. 10 illustrates an example of a confirmation screen 17f after changing the content. The confirmation screen 17f in FIG. 10 includes display content in a state where the button 171 is ineffective after a user has pressed the storage button 171.

After the display of the confirmation screen is changed (ACT35), the image forming apparatus 1 determines again whether or not the image forming for the number of designated copies by the image forming unit 13 is completed (ACT32). The image forming apparatus 1 continues the process to ACT26, when it is determined that image forming of the number of designated copies by the image forming unit 13 is completed (ACT32: YES). Then, the image forming apparatus 1 performs the processes from ACT26 to ACT29 described above (from ACT26 to ACT29). Here, the function control process ends.

Meanwhile, the image forming apparatus 1 continues the process to ACT38, when it is determined that the number of pages does not exceed the threshold value of the number of sheets in ACT30 (ACT30: NO). Then, the image forming apparatus 1 determines whether or not the image forming of the number of designated copies by the image forming unit 13 is completed (ACT38). The number of designated copies is the number of copies designated in ACT11. The image forming apparatus 1 determines whether or not the image forming of the number of designated copies by the image forming unit 13 is completed (ACT38: NO), until the image forming for the number of designated copies is completed. When the image forming of the number of designated copies is completed (ACT38: YES), the image forming apparatus 1 removes the copying data recorded in the memory 21 (ACT29). Here, the function control process ends.

Meanwhile, the image forming apparatus 1 continues the process to ACT36, when it is determined that the automatic storage function is ineffective in ACT13, i.e., not selected to be in the on state (ACT13: NO). The image forming apparatus 1 controls the image reading unit 11 and reads the images of all sheets loaded on the automatic sheet feeding device 11a (ACT36: NO). When reading the images, the image forming apparatus 1 sets the reading conditions of the image reading unit 11 to satisfy the copying conditions.

The image forming apparatus 1 continues the process to ACT37, when the reading of the sheets is completed (ACT36: YES). The image forming apparatus 1 controls the image forming unit 13 or the like, and performs image forming of the image data (copying data) recorded in the memory 21 based on the copying conditions (ACT37).

Next, the image forming apparatus 1 determines whether or not the image forming of the number of designated copies by the image forming unit 13 is completed (ACT38). The number of designated copies is the number of copies designated in ACT11. The image forming apparatus 1 determines whether or not the image forming of the number of designated copies by the image forming unit 13 is completed (ACT38: NO), until the image forming for the number of designated copies is completed. Next, the image forming apparatus 1 removes the copying data recorded in the memory 21 (ACT29). Here, the function control process ends.

By performing the processes described above, the image forming apparatus 1 displays a message for inquiring a user, when the number of pages of the sheets such as a document to be copied exceeds the threshold value of the number of sheets. This message is a message for inquiring a user whether or not to store the image data. The image forming apparatus 1 displays a message for asking a user whether or not to store the image data and whether or not to change the number of copies, when the number of copies exceeds the threshold value of the number of copies. The image forming apparatus 1 continuously displays the message immediately after starting the image forming until the image forming is completed. The image forming apparatus 1 may change the number of output copies depending on the instruction of a user, without stopping the image forming.

Accordingly, the image forming apparatus 1 of the exemplary embodiment may change the copying conditions during the image forming after the copying of the sheets of the document is started. The copying conditions include setting of the number of output copies and setting of storage of the image information in a hard disk.

The operation of the image forming apparatus 1 may be changed as follows. For example, the image forming apparatus 1 may have a configuration of changing the setting of the number of copies, when the number of pages exceeds the threshold value of the number of sheets. The image forming apparatus 1 may have a configuration of performing a determination, based on the number of copies or the number of pages, by comparing a value obtained by multiplying the number of copies and the number of pages, with a predetermined threshold value. The image forming apparatus 1 records the image data read by the image reading unit 11 in the memory 21 as a data item or a file having a format which may be changed to the copying data and the storage data when performing reading-out from the memory. The image forming apparatus 1 converts the image data read out from the memory 21 into the copying data before performing the image forming using the data. The image forming apparatus 1 converts the image data read out from the memory 21 into the storage data before performing storage, and thus the volume of the image data recorded in the memory 21 is reduced. The image forming apparatus 1 may have a configuration of displaying a window of the confirmation display started in ACT18 or the like. The image forming apparatus 1 closes the window, by a closing button or based on an operation of a predetermined operator. The image forming apparatus 1 starts a data storage process based on an instruction from a user with respect to the confirmation display. The image forming apparatus 1 may have a configuration of performing the storage process by omitting instructions input of a user, and automatically removing the stored image data after completing the image forming.

At least one exemplary embodiment described above has the function of receiving the change of the setting of the copying conditions and applying the change to the image forming in progress during the image forming of the image data. With this function, when the setting of the copying conditions during the image forming of the image data is changed, it is possible to perform the image forming of the image data to which the change of the setting is applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
    a setting unit configured to set a copying condition which includes a number of copies;
    an image reading unit configured to read images from sheets to generate image data;
    an image forming unit configured to perform an image processing of forming images on sheets based on the image data and in accordance with the copying condition and the number of copies;
    a random access memory;
    a non-volatile storage unit; and
    a controller configured to:
        control the random access memory to temporarily store, for the image processing, the image data generated by the image reading unit and to delete the image data after completion of the image processing, and
        control the non-volatile storage unit to either store the image data temporarily stored in the random access memory to the non-volatile storage unit to be available for use after completion of the image processing, or not store the image data temporarily stored in the random access memory to the non-volatile storage unit so that the image data is not available for use after completion of the image processing, depending on a predetermined condition, wherein the predetermined condition includes whether the number of copies is larger than a threshold value.

2. The apparatus according to claim 1, wherein
the threshold value is a first threshold value, and
the predetermined condition further includes whether a number of pages of the image data is larger than a second threshold value.

3. The apparatus according to claim 1, wherein
the controller is configured to control a display unit to display a screen which queries whether to save the image data to the non-volatile storage unit to be available for use after completion of the image processing, and
the predetermined condition further includes whether an instruction to save the image data to the non-volatile storage unit is received via the screen.

4. The apparatus according to claim 1, wherein
the controller is further configured to control a display unit to display a screen which queries whether to save the image data to the non-volatile storage unit to be available for use after completion of the image processing, if the number of copies is greater than the threshold value, and
the predetermined condition further includes whether an instruction to save the image data to the non-volatile storage unit is received via the screen.

5. The apparatus according to claim 4, wherein
the screen is a first screen,
the threshold value is a first threshold value,
the controller is further configured to control the display unit to display a second screen which queries whether to save the image data to the non-volatile storage unit to be available for use after completion of the image processing, if the number of pages of the image data is larger than a second threshold value, and
the predetermined condition further includes whether an instruction to save the non-volatile image data to the storage unit is received via the second screen.

6. The apparatus according to claim 5, wherein the first screen includes an input area portion for changing the number of copies.

7. The apparatus according to claim 6, wherein the image reading unit includes a scanner configured to generate the image data.

8. The apparatus according to claim 5, wherein if the first screen or the second screen is displayed, the displayed screen is displayed until completion of the image processing.

9. A control method of an image forming apparatus, the method comprising:
    receiving a setting condition which includes a number of copies;
    receiving image data;

controlling a random access memory to temporarily store the received image data;

performing an image processing including forming images on sheets based on the image data temporarily stored in the random access memory and in accordance with the setting condition and the number of copies;

controlling a non-volatile storage unit to either store the image data temporarily stored in the random access memory to the non-volatile storage unit to be available for use after completion of the image processing, or not store the image data temporarily stored in the random access memory to the non-volatile storage unit so that the image data is not available for use after completion of the image processing, depending on a predetermined condition, wherein the predetermined condition includes whether the number of copies is smaller than a threshold value; and controlling the random access memory to delete the temporarily stored image data after completion of the image processing.

10. The control method of claim 9, wherein
the threshold value is a first threshold value, and
the predetermined condition further includes whether a number of pages of the image data is larger than a second threshold value.

11. The control method of claim 9, further comprising:
controlling a display unit to display a screen which queries whether to save the image data to the non-volatile storage unit to be available for use after completion of the image processing, wherein
the predetermined condition further includes whether an instruction to save the image data to the non-volatile storage unit is received via the screen.

12. The control method of claim 9, further comprising
controlling a display unit to display a screen which queries whether to save the image data to the non-volatile storage unit to be available for use after completion of the image processing, if the number of copies is greater than the threshold value, wherein
the predetermined condition further includes whether an instruction to save the image data to the non-volatile storage unit is received via the screen.

13. The control method of claim 12, wherein the screen includes an input area for changing the number of copies.

14. The control method of claim 12, the screen is displayed until completion of the image processing.

15. The control method of claim 12, further comprising:
generating the image data by a scanner.

16. An apparatus for forming a copy of an image on a sheet, comprising:

a receiving unit configured to receive image data and a setting condition which includes a number of copies;

an image forming unit configured to perform an image processing of forming images on sheets based on the image data and in accordance with the setting condition and the number of copies;

a random access memory;

a non-volatile storage unit; and a controller configured to:

control the random access memory to temporarily store, for the image processing, the image data generated by the image reading unit and to delete the image data after completion of the image processing, and control the non-volatile storage unit to either store the image data temporarily stored in the random access memory to the non-volatile storage unit to be available for use after completion of the image processing, or not store the image data temporarily stored in the random access memory to the non-volatile storage unit, depending on a predetermined condition, wherein the predetermined condition includes whether the number of copies is larger than a threshold value.

17. The apparatus according to claim 16, wherein
the threshold value is a first threshold value, and
the predetermined condition further includes whether a number of pages of the image data is larger than a second threshold value.

18. The apparatus according to claim 16, wherein
the controller is further configured to control a display unit to display a screen which queries whether to save the image data to the non-volatile storage unit to be available for use after completion of the image processing, and
the predetermined condition further includes whether an instruction to save the image data to the non-volatile storage unit is received.

19. The apparatus according to claim 16, wherein
the threshold value is a first threshold value,
the controller is further configured to control the display unit to display a screen which queries whether to save the image data to the non-volatile storage unit to be available for use after completion of the image processing, if the number of pages of the image data is larger than a second threshold value, and
the predetermined condition further includes whether an instruction to save the image data to the non-volatile storage unit is received via the second screen.

* * * * *